June 20, 1961 L. SUCHOW 2,989,411
NACREOUS IRON OXIDE PIGMENT AND METHOD OF PREPARATION
Filed Dec. 9, 1957
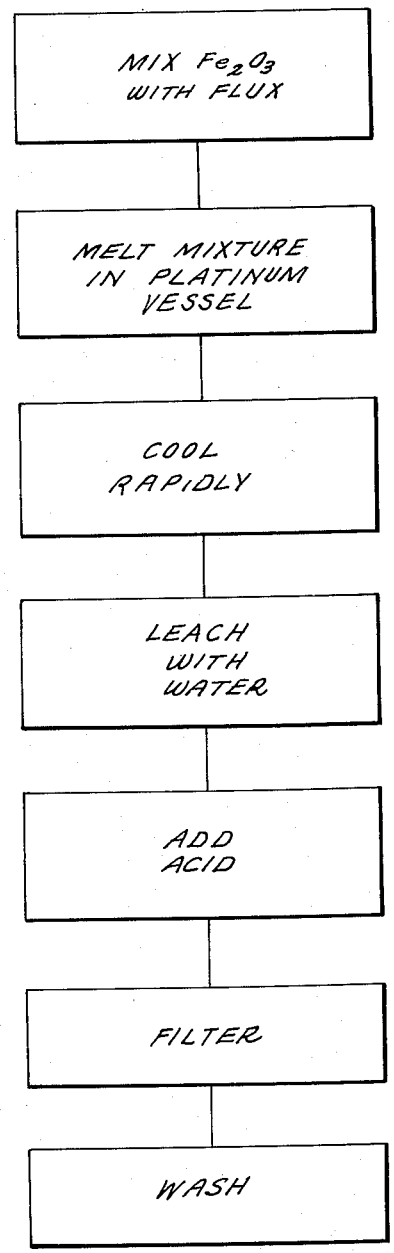
INVENTOR.
LAWRENCE SUCHOW
BY
ATTORNEYS

2,989,411
NACREOUS IRON OXIDE PIGMENT AND METHOD OF PREPARATION

Lawrence Suchow, New York, N.Y., assignor to Francis Earle Laboratories, Inc., Peekskill, N.Y., a corporation of New York
Filed Dec. 9, 1957, Ser. No. 701,667
8 Claims. (Cl. 106—193)

This invention relates to a synthetic, nacreous, magnetic alpha iron oxide pigment and is a continuation-in-part of copending application Serial No. 531,300, filed August 29, 1955, now abandoned.

Substances which have a high index of refraction and form thin, plate-like crystals are commonly used to produce a nacreous, mother-of-pearl-like effect. To produce this optical effect, nacreous pigments are incorporated in a film or plastic in such a manner that the thin plate-like crystals lie parallel to one another. The nacre is caused by simultaneous reflection of light from many parallel surfaces. Pearl essence and lead hydrogen phosphate are common nacreous pigments.

Certain substances are of interest because of their magnetic properties. Magnetism is inherent in such substances as metallic iron, and certain complex iron oxides, like $Fe_3O_4$ and $MnFe_2O_4$, both of which have the spinel structure, and $BaFe_{12}O_{19}$, which exhibits hexagonal symmetry. Whereas iron is a good conductor, the magnetic oxides have certain advantages in being non-conductors. Such magnetic compounds are commonly used in television circuits, electronic computing devices, magnetic tape, etc.

Although the two properties of nacre and megnetism are found separately in many different materials, they have not been brought together in a single crystalline substance. It is, accordingly, a fundamental object of this invention to provide a nacreous alpha iron oxide pigment which is also magnetic.

It is another object of the invention to provide a method of preparing a nacreous alpha iron oxide pigment.

It is another object of the invention to provide a laminar product and a means for preparing it which is characterized by the presence of nacreous alpha iron oxide with the plates thereof oriented as desired in the pigmented layer.

Other objects and advantages of the invention will in part be obvious and in part appear hereinafter from the drawing and description which follow.

The drawing is a flow diagram illustrating the process of making the synthetic nacreous alpha-iron oxide of the present invention.

The invention is embodied in a synthetic nacreous alpha iron oxide ($\alpha$-$Fe_2O_3$) pigment which is characterized by its crystalline form which displays hexagonal symmetry and has high refractive indices, and the process of preparing such novel form of iron oxide pigment by fusing ferric oxide with a flux of a boron compound such as an alkali metal borate or boric oxide, cooling the melt rapidly, leaching it with water, acidifying it and finally filtering and washing. The process results in the formation of a highly lustrous rust-colored alpha iron oxide which when examined microscopically is seen to consist of thin plate-like red crystals having diameters in the range of about 3 to 20 microns. The actual size of the crystals varies with the rate at which the melt is cooled, and with slow cooling it is possible to grow even macroscopic crystals. Crystals two millimeters in diameter and larger have been obtained.

It is apparent, of course, that the optimum crystal size will depend upon the ultimate application. Thus, for electronic applications the large, macroscopic crystal would be useful. On the other hand where the nacreous effect is of prime importance, crystal plates giving best results are in the size range of from 2 to 100 microns. This dimension is the diameter as measured in the plane of the flat, plate-like crystal. The thickness of such crystals would be of the order of about 0.1 to 1 micron.

It is further desired that the ratio of diameter to thickness be at least 4. Thus, particles of 2 microns in diameter are suitable if they are 0.5 micron or less in thickness. Platelets 1 micron thick should be at least 4 microns in diameter. Although particle size of 2 to 100 microns diameter produce optimum luster, platelets which are as small as 0.5 micron in diameter are suitable if the crystals are sufficiently thin.

The following examples will illustrate specifically the method for preparation of the pigment.

Example I

Three parts by weight, of $Fe_2O_3$ are mixed with 7 parts of $K_2B_4O_7 \cdot 4H_2O$, said the mixture is placed in a suitable crucible, for example, platinum. The crucible is then placed into a muffle furnace, heated and held at 1100° C. for 17 hours, after which cooling is accomplished rapidly by air-quenching. The solidified melt is leached with hot water, and sufficient acid (preferably acetic acid) is added to lower the pH value of the water to approximately five. The suspension is filtered, and the pigment washed with water. The acid leaching should be carried out with an acid in which the iron oxide is insoluble, and acetic acid is the common one useful for the purpose. However, other acids may be used as well, nitric acid, for example, used to reduce the pH value to approximately one, attacks the crystals so slowly that it may be utilized satisfactorily.

Example II

Two parts, by weight, of $Fe_2O_3$ are mixed with 8 parts, by weight, of $Na_2B_4O_7 \cdot 10H_2O$ and the mixture is placed in an appropriate crucible, such as platinum. The crucible is heated at 1200° C. for 14 hours, and is cooled by air-quenching. The melt is leached with hot water which is acidfied to a pH value of about one (using nitric acid). The crystals are filtered off, and washed with water.

In the above examples any form of $Fe_2O_3$ may be used as the starting material, the most convenient being alpha or gamma $Fe_2O_3$.

When the pole of a magnet is brought close to these plate-like crystals of $\alpha$-$Fe_2O_3$, the plates stand perpendicular to the pole, demonstrating that the crystal is magnetically anisotropic. Since the $\alpha$-$Fe_2O_3$ crystals are weakly ferromagnetic and only in the plane of the plate they will flip over in place, but will not migrate toward the pole, thereby maintaining uniform nacre.

When these crystals are suspended in water or in an organic solvent, they produce, on stirring, the silky or pearly appearance which is typical of nacreous crystals. The motion of the liquid causes the crystals to be oriented with respect to each other, and luster is produced as light is reflected from numerous parallel faces. Unlike all other nacreous crystals, however, the luster of these ferric oxide crystals can be demonstrated by bringing a magnet into proximity with the container. The orientation of the crystals in the magnetic field is immediately obvious as the intensity of the reflected light changes with a shift in the magnetic field. Indeed, this effect can be used to make visible the direction of a magnetic field in a liquid.

This property has particular application in the orientation of plate-like crystals to achieve pearl-like effects. When a nacreous pigment like natural pearl essence is incorporated in a plastic sheet, the crystals are suspended in the monomer or partially polymerized monomer, which is then cast. Such techniques are commonly used in making the methyl methacrylate or polyester pearl sheets from which "pearl" buttons are manufactured. In order to obtain maximum luster from the pearl essence, it is necessary that the crystals all be properly oriented. The orientation is most often brought about during polymerization by the convection currents which are set up in the suspension by the heating bath. In practice, however, it is very rare that complete orientation can be obtained.

By using a magnetically anisotropic crystal, which orients in a magnetic field, orientation is achieved in a thorough and reproducible manner by the application of a suitable field. Of course, the pigment can also be used as a conventional nacreous material without consideration of its magnetic properties.

The nacreous alpha iron oxide of the present invention has in addition certain very useful properties which are independent of its magnetism. White nacreous crystals are not desirable components of deeply colored compositions, for example, since they reduce the intensity of the color. Being rust-colored, these ferric oxide crystals produce a nacreous effect in red or brown compositions without this danger. These crystals are also unusual in thermal stability, since their melting point is 1565° C. The common nacreous pigments are considerably less stable.

The form in which the nacreous crystals, in this instance the nacreous iron oxide crystals, are commonly prepared for use is a paste consisting essentially of a vehicle which is an organic film-forming plastic material in a solvent, to make a clear lacquer, with the nacreous material as a pigment. When used in making nacreous films, cellulose nitrate lacquers are common.

A typical paste composition useful for stock material to be diluted to a useful concentration level is the following:

| | Parts by weight |
|---|---|
| Nacreous iron oxide | 2 |
| Cellulose nitrate | 1 |
| Suitable solvent (amyl acetate containing some ethanol) | 3 |

In corresponding fashion, there may be substituted almost any clear lacquer formula for the vehicle for the iron oxide pigment. Generally a translucent or transparent plastic material such as cellulose acetate, cellulose nitrate, the alkyd resins, the vinyl resins, as well as the acrylic acid ester resins, will be found very useful. In general, the basic principle to observe is that the index of refraction of the crystal employed should differ substantially from the index of refraction of the vehicle. Generally, the crystal should have a refractive index at least 0.2 higher than that of the vehicle.

Furthermore, the very high melting point of the ferric oxide makes possible its use as a nacreous pigment in transparent inorganic substances, such as glass. The dry crystals may be dispersed in molten glass, and then oriented by the operations utilized in molding or blowing the glass. The time during which the mixture is at the elevated temperature must be limited, however, since the hot glass has some solubility for the oxide.

Though the invention has been described with reference to only a few embodiments thereof, it will be understood that variations thereof may be practiced without departing from its spirit or scope.

What is claimed is:

1. A synthetic nacreous composition having, as a nacre-producing substance therein, plate-like crystals of magnetic alpha iron oxide, said crystals having a particle size in the range of about 2 to 100 microns in diameter, a diameter to thickness ratio of at least 4, said crystals being suspended in a light transmitting liquid medium.

2. A nacreous composition comprising a paste having, as a nacre-producing substance therein, plate-like crystals of magnetic alpha iron oxide, said crystals having a particle size in the range of about 2 to 100 microns in diameter and a diameter to thickness ratio of at least 4, and being suspended in an organic, light-transmitting liquid vehicle.

3. A coating composition comprising flat, plate-like crystals of magnetic alpha iron oxide suspended in a light-transmitting lacquer having a particle size in the range of about 2 to 100 microns in diameter and a diameter to thickness ratio of at least 4.

4. As a new product, a resinous article characterized by its being formed of an organic plastic in which is embedded a pigment consisting essentially of plate-like crystals of synthetic nacreous alpha iron oxide, said crystals having a particle size in the range of about 2 to 100 microns in diameter and a diameter to thickness ratio of at least 4.

5. As a new product, a nacreous object coated with a resinous material in which is dispersed synthetic plate-like, nacre-producing crystals of alpha iron oxide having a particle size in the range of about 2 to 100 microns in diameter and a diameter to thickness ratio of at least 4.

6. As a new product, a nacreous object coated with nitrocellulose in which is dispersed synthetic plate-like, nacre-producing alpha iron oxide having a particle size in the range of about 2 to 100 microns in diameter and a diameter to thickness ratio of at least 4.

7. An article in accordance with claim 4, in which the alpha iron oxide pigment particles are axially oriented principally in a single direction.

8. An object in accordance with claim 5, in which the alpha iron oxide pigment particles are axially oriented principally in a single direction.

References Cited in the file of this patent

UNITED STATES PATENTS

| 1,607,624 | Higgins | Nov. 23, 1926 |
| 2,570,856 | Pratt et al. | Oct. 9, 1951 |
| 2,689,167 | Dovey et al. | Sept. 14, 1954 |
| 2,783,207 | Tombs | Feb. 26, 1957 |

OTHER REFERENCES

Mellor: "Comprehensive Treatise on Inorganic and Theoretical Chemistry" (1934), vol. XIII, pages 775 and 779.